No. 11,754. Reissued July 4, 1899.

C. MEHRING.

CAR COUPLING.

(Application filed June 2, 1899.)

WITNESSES:

Sidney D. Lowe.

W H Stubbs

INVENTOR

C. Mehring.

BY

Edward P. Thompson

ATTORNEY

THE NORRIS PETERS CO., PHOTO-LITHO., WASHINGTON, D. C.

UNITED STATES PATENT OFFICE.

CHARLES MEHRING, OF CHARLOTTESVILLE, VIRGINIA.

CAR-COUPLING.

SPECIFICATION forming part of Reissued Letters Patent No. 11,754, dated July 4, 1899.

Original No. 613,523, dated November 1, 1898. Application for reissue filed June 2, 1899. Serial No. 719,087.

*To all whom it may concern:*

Be it known that I, CHARLES MEHRING, a citizen of the United States, residing at Charlottesville, in the county of Albemarle and State of Virginia, have invented a certain new and useful Improvement in Car-Couplers, of which the following is a specification.

This invention relates to car-couplers, and particularly to the class of twin-jaw couplers, the object of the invention being to provide a coupler with a vertically-swinging jaw and a laterally-swinging jaw for the purpose of making a double coupling that will couple cars on curves.

Figure 1:
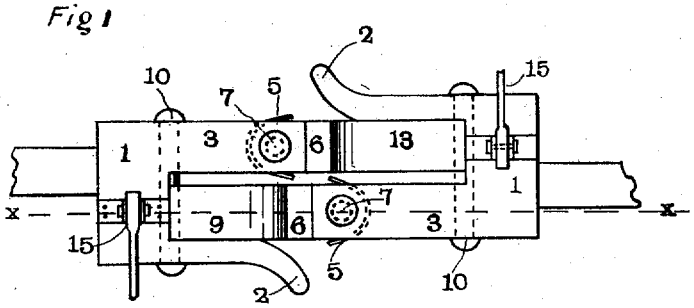
Figure 2:
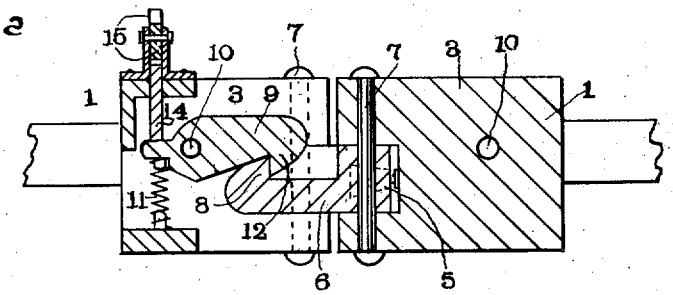
Figure 3:
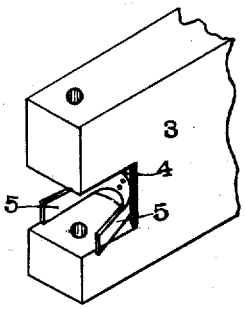

In the drawings, Figure 1 is a top plan view. Fig. 2 is a section on the line *x x*, Fig. 1. Fig. 3 is a perspective view of the portion of the draw-bar having a spring attached.

The same numeral-references denote the same parts throughout the several figures of the drawings.

The draw-bar 1 has a flaring flange 2 upon one side and a straight side 3, provided with a recess 4 in the end, into which recess a plate-spring 5 is secured. A laterally-swinging jaw 6 is secured in the recess 4 by means of a pivot-pin 7. This jaw has an enlarged semicircular end engaged by the spring 5 to prevent the jaw from swinging too far away from the draw-bar, and the other end of the jaw has an upturned lip 8. A vertically-swinging jaw 9 is secured in the center of the draw-bar by means of a pivot-pin 10. One end of this jaw is controlled by a spiral spring 11, and the other end has a downwardly-turned lip 12 to engage the lip 8 in coupling, while a jaw 13, like the jaw 9, engages the lip of the other laterally-swinging jaw. The vertically-swinging jaws 9 and 13 are operated to disengage the jaws and uncouple by means of a vertical slide 14, one end of which bears against the vertically-swinging jaws, and the other end is worked by a hand-lever 15 either from the top or side of the car-platform.

It will be observed that the spiral springs hold the vertically-swinging jaws in proper position for coupling and the plate-springs do the same by the laterally-swinging jaws, and in coupling one laterally-swinging jaw engages one vertically-swinging jaw, the other jaws being likewise engaged, thereby effecting a double independent coupling whether on a straight or curved track, the flange 2 on each draw-bar 1 serving to guide the laterally-swinging jaws to be engaged by the vertically-swinging jaws, especially on a curve.

Having thus described my invention, what I claim as new, and desire to secure by Letters Patent, is—

1. The combination, with a suitable draw-bar, of a jaw pivoted in the draw-bar to swing vertically, and a jaw pivoted in said draw-bar to swing laterally, said vertically-swinging jaw adapted to be engaged by a laterally-swinging jaw on another draw-bar, and the said laterally-swinging jaw adapted to be engaged by a vertically-swinging jaw on the latter draw-bar.

2. The combination, with the draw-bar having a recessed edge, and a plate-spring secured in said recess, of the laterally-swinging jaw pivoted in said recess and engaged by said spring, and the spring-controlled vertically-swinging jaw pivoted in said draw-bar and adapted to operate at right angles to the laterally-swinging jaw.

3. The combination, with a suitable draw-bar, of a jaw pivoted in the draw-bar to swing vertically, and a jaw pivoted in said draw-bar to swing laterally, said vertically-swinging jaw adapted to be engaged by a laterally-swinging jaw on another draw-bar and the said laterally-swinging jaw adapted to be engaged by a vertically-swinging jaw on the latter draw-bar, and a guiding flaring flange 2, upon one side of each draw-bar and adapted to direct said laterally-swinging jaws to swing to positions to be engaged by said vertically-swinging jaws.

In testimony whereof I have hereunto subscribed my name this 18th day of May, 1899.

CHARLES MEHRING. [L. S.]

Witnesses:
W. L. MAUPIN,
MECLIJAH WOODS.